(12) United States Patent
Hu et al.

(10) Patent No.: US 12,337,735 B2
(45) Date of Patent: Jun. 24, 2025

(54) SELF-BALANCING VIBRATION DAMPING SYSTEM, ACTIVE VIBRATION DAMPING SEAT, AND TRANSPORT EQUIPMENT

(71) Applicant: Ningbo Gauss Robot Co., Ltd., Ningbo (CN)

(72) Inventors: Jingchen Hu, Shanghai (CN); Qiyin Guo, Shanghai (CN); Yanjun Zeng, Shanghai (CN)

(73) Assignee: Ningbo Gauss Robot Co., Ltd., Ningbo (CN)

( * ) Notice: Subject to any disclaimer, the term of this patent is extended or adjusted under 35 U.S.C. 154(b) by 174 days.

(21) Appl. No.: 18/081,709

(22) Filed: Dec. 15, 2022

(65) Prior Publication Data

US 2023/0182628 A1  Jun. 15, 2023

(30) Foreign Application Priority Data

Dec. 15, 2021  (CN) .......................... 202111534952.8
Dec. 2, 2022   (CN) .......................... 202223212561.7

(51) Int. Cl.
  *B60N 2/50*  (2006.01)
  *F16F 15/00* (2006.01)
  (Continued)

(52) U.S. Cl.
  CPC ............ *B60N 2/501* (2013.01); *F16F 15/002* (2013.01); *F16F 15/022* (2013.01);
  (Continued)

(58) Field of Classification Search
  CPC  B60N 2/501; B60N 2/502; B60N 2/60; F16F 15/02; F16F 15/002; F16F 15/022;
  (Continued)

(56) References Cited

U.S. PATENT DOCUMENTS 5,124,938 A     6/1992  Algrain
10,046,677 B2 *  8/2018  Parker ...................... B60N 2/38
(Continued)

FOREIGN PATENT DOCUMENTS

CN   201525024 U  *  7/2010
CN   109080733 A     12/2018
(Continued)

*Primary Examiner* — Eret C McNichols
*Assistant Examiner* — Tan Le
(74) *Attorney, Agent, or Firm* — JCIPRNET

(57) ABSTRACT

A self-balancing vibration damping system, an active vibration damping seat, and transport equipment are provided. The self-balancing vibration damping system includes an active vibration damping module, a control module, a sensor module, and a receiving module, where the sensor module is configured to acquire motion data of the transport equipment; the active vibration damping module includes a first rotating assembly and a second rotating assembly; the first rotating assembly is provided in an accommodation space; the second rotating assembly is provided at a driving end of the first rotating assembly, and is butted with the receiving module; the control module is configured to control the first rotating assembly and the second rotating assembly to operate synchronously according to the motion data, so as to provide a force opposite to a tilt direction of the receiving module.

12 Claims, 12 Drawing Sheets

(51) Int. Cl.
*F16F 15/02* (2006.01)
*F16M 11/12* (2006.01)
*F16M 11/18* (2006.01)

(52) U.S. Cl.
CPC .......... *F16M 11/125* (2013.01); *F16M 11/18* (2013.01); *B60N 2/502* (2013.01); *F16F 2230/0011* (2013.01); *F16F 2230/18* (2013.01); *F16M 2200/04* (2013.01)

(58) Field of Classification Search
CPC .......... F16F 2230/0011; F16F 2230/18; F16M 11/18; F16M 11/12; F16M 11/125; F16M 2200/04
See application file for complete search history.

(56) References Cited

U.S. PATENT DOCUMENTS

| | | |
|---|---|---|
| 10,245,987 B2 * | 4/2019 | Castillo .................... B60N 2/04 |
| 10,821,859 B2 | 11/2020 | Parker et al. |
| 11,134,196 B2 | 9/2021 | Wang et al. |
| 2019/0253596 A1 | 8/2019 | Wang |
| 2021/0170925 A1 | 6/2021 | Tucker et al. |

FOREIGN PATENT DOCUMENTS

| | | | | |
|---|---|---|---|---|
| CN | 115675214 A | * | 2/2023 | ........... B60N 2/0244 |
| EP | 4198336 A1 | * | 6/2023 | ............. B60N 2/501 |
| EP | 4372491 A2 | * | 5/2024 | ........... B60N 2/0244 |
| JP | H10203221 A | | 8/1998 | |

* cited by examiner

SELF-BALANCING VIBRATION DAMPING SYSTEM, ACTIVE VIBRATION DAMPING SEAT, AND TRANSPORT EQUIPMENT

CROSS REFERENCE TO THE RELATED APPLICATIONS

This application is based upon and claims priority to Chinese Patent Application No. 202111534952.8, filed on Dec. 15, 2021; and Chinese Patent Application No. 202223212561.7, filed on Dec. 2, 2022, the entire contents of which are incorporated herein by reference.

TECHNICAL FIELD

The present disclosure relates to the technical field of vibration damping of transport equipment and in particular to a self-balancing vibration damping system, an active vibration damping seat, and transport equipment.

BACKGROUND

Transport equipment, such as vehicles, ships, and yachts, can sense up-down vibration caused by uneven roads and inertial displacement caused by rapid acceleration or emergency stops in real-time and automatically make corresponding compensations to keep people, devices, or special materials on board in a relatively balanced state on the move. This is called self-balancing of the transport equipment.

The transport equipment will bump and vibrate due to poor road conditions, heavy winds and waves, or other factors, which will cause carsickness or seasickness in people on board. In addition, when special devices or materials are transported by the transport equipment, they are likely to be damaged or deteriorated due to shaking, vibration, and other factors. At present, passive vibration damping measures are often adopted to solve the above problems. For example, the vehicle seat or ship seat is provided with a passive vibration damping spring for vibration damping, and a layer of passive vibration damping pad is adopted when special devices or materials are transported. Chinese Patent Application CN201811151776.8 provides a robot chassis and robot, which converts excessive pitching motion caused by a sudden change of speed into the up-down movement of the chassis through a balancing swing bar to ensure smooth operation of the robot. The balance is realized on one degree of freedom by purely mechanical means and passive vibration damping. The passive vibration damping measure can dampen high-frequency low-amplitude vibration, but it cannot dampen extremely-low-frequency high-amplitude vibration and cannot solve the balance problem when up-down movement, pitch, and roll coexist under complex road conditions. At present, there are also some vehicles with active suspension and some ships with anti-roll function, but they have a poor damping effect, lack a self-balancing function, and are expensive. In particular, the vibration of medical rescue vehicles has a great impact on the injured and sick, or blood and special drugs. Research shows that the inertial motion of vehicles caused by an emergency stop, etc. has a significant impact on the blood pressure and distribution of blood in the injured, even endangering the life of the injured in serious cases.

It has always been an urgent problem for those skilled in the art to solve these technical defects in the prior art.

SUMMARY

An objective of the present disclosure is to provide a self-balancing vibration damping system, an active vibration damping seat, and transport equipment. In the self-balancing vibration damping system, a control module controls a first rotating assembly and a second rotating assembly to operate synchronously according to motion data acquired by a sensor module to control a receiving module to roll and pitch, that is, to realize two degrees of freedom. In this way, a force opposite to the tilt direction of the receiving module is provided to keep the receiving module stable.

The present disclosure provides the following technical solutions.

A first aspect of the present disclosure provides a self-balancing vibration damping system, including:
an active vibration damping module, a control module, a sensor module, and a receiving module.

The sensor module is provided in an accommodation space of transport equipment to acquire motion data of the transport equipment.

The active vibration damping module includes a first rotating assembly and a second rotating assembly. The first rotating assembly is provided in the accommodation space, and the second rotating assembly is provided at the driving end of the first rotating assembly and is butted with the receiving module.

The control module is configured to control the first rotating assembly and the second rotating assembly to operate synchronously according to the motion data to provide a force opposite to the tilt direction of the receiving module. When the first rotating assembly drives the receiving module to roll, the second rotating assembly drives the receiving module to pitch. Alternatively, when the first rotating assembly drives the receiving module to pitch, the second rotating assembly drives the receiving module to roll.

In some implementations, the self-balancing vibration damping system further includes:
a support module located below the receiving module.

The first rotating assembly and the sensor module are provided on the support module.

In some implementations, the self-balancing vibration damping system further includes:
a passive vibration damping module provided on the support module.

The first rotating assembly and the second rotating assembly are connected in series with the passive vibration damping module.

In some implementations, the passive vibration damping module includes a spring damper.

In some implementations, the first rotating assembly includes a first motor, a first flange seat, and a rotating pair support.

The first motor and the rotating pair support are provided on the support module. The first flange seat has one end provided at the driving end of the first motor and the other end hinged to the rotating pair support.

The second rotating assembly includes a second motor and a second flange seat.

The second motor is provided on the first flange seat, and the second flange seat is provided at a driving end of the second motor and butted with the receiving module.

The rotation axes of the first motor and the second motor are perpendicular to each other.

In some implementations, the first flange seat is provided with a stop element, and the second flange seat is provided with an anti-collision element.

When the first flange seat and the second flange seat rotate, the stop element and the anti-collision element are butted and mated with each other to restrict the continuous rotation of the first flange seat and the second flange seat.

In some implementations, the receiving module includes a first platform, and the support module includes a second platform.

The sensor module is provided at one end of the second platform toward the first platform.

The passive vibration damping module is provided at the other end of the second platform away from the first platform.

In some implementations, the receiving module includes a first platform, and the support module includes a second platform and a third platform.

The second platform is located between the first platform and the third platform.

The sensor module is provided at one end of the third platform toward the second platform.

The passive vibration damping module is provided between the second platform and the third platform.

In some implementations, four corners of the third platform are respectively provided with four guide rods.

The positions of the second platform corresponding to the four guide rods are respectively provided with four sliding holes.

The four guide rods are slidably connected with the four sliding holes to adjust the distance between the second platform and the third platform under the action of the passive vibration damping module.

In some implementations, the active vibration damping module further includes two linear drive assemblies.

The two linear drive assemblies are symmetrically arranged on two opposite sides of the support module and are connected in parallel with the passive vibration damping module.

The linear drive assemblies each include an electric push rod and a ball joint.

The electric push rod includes a drive body and a telescopic rod connected with the drive body in a driving manner.

The two drive bodies are symmetrically arranged on two opposite sides of the third platform.

Positions of the second platform corresponding to the two telescopic rods are respectively provided with ball joint supports.

The ball joint is provided at a free end of the telescopic rod and butted with the ball joint support.

A second aspect of the present disclosure provides an active vibration damping seat, including:

a self-balancing vibration damping device and a seat.

The seat is provided on the self-balancing vibration damping device.

The self-balancing vibration damping device is suitable to be provided on transport equipment and includes a sensor module, a control module, and an active vibration damping module. The sensor module is configured to acquire motion data of the transport equipment. The control module is configured to receive data of the sensor module and control a motion parameter of the active vibration damping module. The active vibration damping module includes a first rotating assembly and a second rotating assembly. The first rotating assembly is suitable to be provided on the transport equipment. The second rotating assembly is provided at the driving end of the first rotating assembly. The first rotating assembly and the second rotating assembly are able to drive the seat to roll and pitch.

In some implementations, the active vibration damping module further includes an elastic damping assembly. The elastic damping assembly has a top end provided on the seat and a bottom end fixed on a mounting plane of the self-balancing vibration damping device and is configured to exert a force on the seat in a height direction.

In some implementations, the elastic damping assembly further includes an air spring, and the air spring has a top end provided on the seat and a bottom end provided on the mounting plane of the self-balancing vibration damping device.

In some implementations, the elastic damping assembly further includes an air pump connected with the air spring and the control module. The control module controls the air pump to work based on the data of the sensor module to control the air spring to drive the seat to move in the height direction.

In some implementations, the active vibration damping module further includes a telescopic rod. The telescopic rod has one end connected with the seat and the other end connected with the mounting plane of the self-balancing vibration damping device and is configured to control the seat to move within a limited range when the active vibration damping module controls the seat to move.

In some implementations, the telescopic rod is located outside the driving end of the second rotating assembly. The position of the seat corresponding to the telescopic rod is provided with a mounting plate for fixing one end of the telescopic rod toward the seat.

In some implementations, the active vibration damping seat further includes a base. The self-balancing vibration damping device is provided on the base, and the base is suitable to be provided on the transport equipment.

The active vibration damping seat further includes a slide rail provided under the base and configured to adjust the distance between the base and the transport equipment.

A third aspect of the present disclosure provides transport equipment, including the active vibration damping seat according to any one of the above implementations.

The present disclosure has the following technical effects:

1. In the self-balancing vibration damping system of the present disclosure, the sensor module is provided in the accommodation space of the transport equipment to acquire the motion data of the transport equipment. The control module controls the first rotating assembly and the second rotating assembly to operate synchronously according to the motion data acquired by the sensor module to control the receiving module to roll and pitch, that is, to realize two degrees of freedom. In this way, a force opposite to the tilt direction of the receiving module is provided to keep the receiving module stable to achieve a self-balancing vibration damping effect.

2. In the active vibration damping seat of the present disclosure, the control module controls the first rotating assembly and the second rotating assembly to operate synchronously according to the motion data acquired by the sensor module to control the seat to roll and pitch, that is, to realize two degrees of freedom. In this way, a force opposite to the tilt direction of the seat is provided to keep the seat stable to achieve a self-balancing vibration damping effect. Meanwhile, the control module can control the elastic damping assembly to assist the first rotating assembly and the second rotating assembly to pitch and roll. The elastic damping assembly can realize the up-down movement of the seat in the height direction, thus further strengthening the active vibration damping effect of the active vibration damping seat. The telescopic rod having one end connected with the seat and the other end connected with the mounting plane of the self-balancing vibration damping device can control the seat to move within a limited range when the active vibration damping module controls the seat to move. This design can prevent the seat from detaching from the self-balancing vibration damping device, thus ensuring the active vibration damping effect.

BRIEF DESCRIPTION OF THE DRAWINGS

The present disclosure is described in further detail below by referring to the drawings and specific implementations.

REFERENCE NUMERALS

Figure 1:
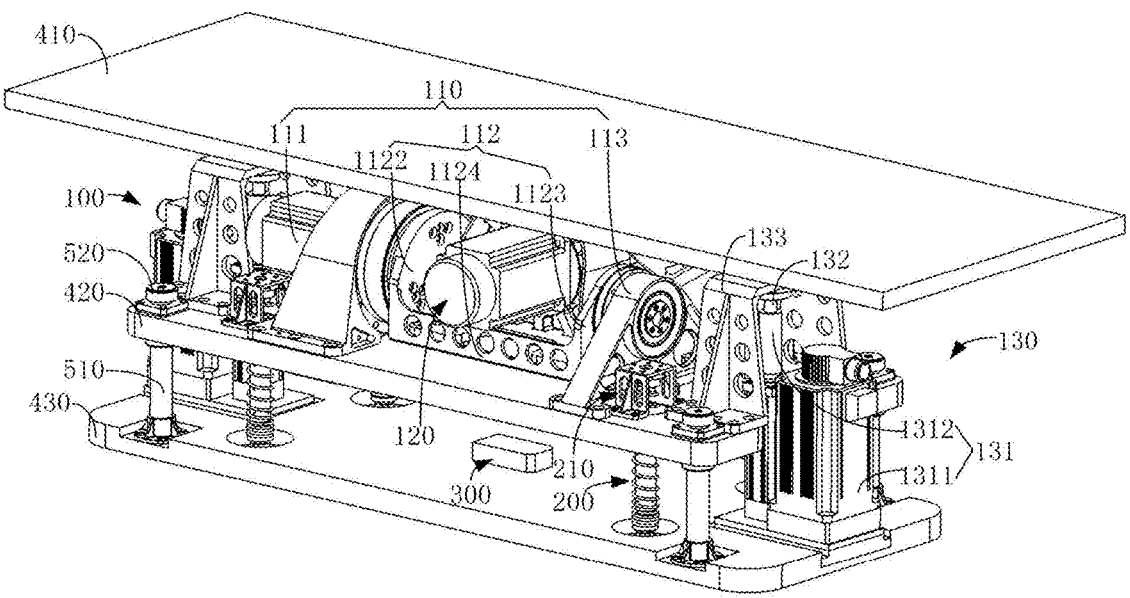
FIG. 1 is a structural diagram of a self-balancing vibration damping system according to an embodiment of the present disclosure.

100. active vibration damping module; 110. first rotating assembly; 111. first motor; 112. first flange seat; 1121. stop element; 1122. first flange; 1123. second flange; 1124. mounting plate; 113. rotating pair support; 120. second rotating assembly; 121. second motor; 122. second flange seat; 1221. anti-collision element; 130. linear drive assembly; 131. electric push rod; 1311. drive body; 1312. telescopic rod; 132. ball joint; 133. ball joint support; 200. passive vibration damping module; 210. top support; 300. sensor module; 410. first platform; 420. second platform; 430. third platform; 510. guide rod; 520. stop portion; 1*a*. seat; 11*a*. seatback; 12*a*. armrest; 13*a*. rubber boot; 2*a*. self-balancing vibration damping device; 21*a*. sensor module; 22*a*. active vibration damping module; 221*a*. first rotating assembly; 222*a*. second rotating assembly; 223*a*. elastic damping assembly; 2231*a*. air spring; 2232*a*. air pump; 224*a*. telescopic rod; 225*a*. mounting plate; 23*a*. control module; 3*a*. base; 4*a*. slide rail; and 5*a* fixing plate.

DETAILED DESCRIPTION OF THE EMBODIMENTS

To explain the embodiments of the present disclosure or the technical solutions in the prior art more clearly, the specific implementations of the present disclosure will be described below with reference to the drawings. The drawings in the following description show merely some embodiments of the present disclosure, and other drawings and other implementations may be derived from these drawings by those of ordinary skill in the art without creative efforts.

To keep the drawings uncluttered, the drawings only show components related to the present disclosure, but it does not necessarily mean that these are the components that can represent the actual structure of the product. Further, to provide a better understanding of the technical solutions or embodiments, only one of the components having the same structure or function is schematically shown or marked in some drawings. In the description of the present disclosure, "one" not only means "only one" but also means "more than one".

It should also be further understood that the term "and/or" used in this specification of the present disclosure and the appended claims refers to one, any, or all possible combinations of a plurality of associated items that are listed and includes these combinations.

In the description of the present disclosure, it should be noted that, unless otherwise clearly specified, meanings of the terms "provided", "connected with", and "connected to" should be understood in a broad sense. For example, the connection may be a fixed connection, a removable connection, or an integral connection; may be a mechanical connection or an electrical connection; may be a direct connection or an indirect connection by using an intermediate medium, or may be intercommunication between two components. Those of ordinary skill in the art may understand specific meanings of the above terms in the present disclosure based on the specific situation.

In addition, in the description of the present disclosure, the terms such as "first" and "second" are used only for distinguishing components, rather than to indicate or imply relative importance.

According to a specific embodiment provided by the present disclosure, as shown in FIGS. 1 to 13, a self-balancing vibration damping system provided on transport equipment specifically includes active vibration damping module 100, a control module, sensor module 300, and a receiving module. The sensor module 300 is provided in an accommodation space of the transport equipment to acquire motion data of the transport equipment. The active vibration damping module 100 includes first rotating assembly 110 and second rotating assembly 120. The first rotating assembly 110 is provided in the accommodation space, and the second rotating assembly 120 is provided at a driving end of the first rotating assembly 110 and is butted with the receiving module. The control module controls the first rotating assembly 110 and the second rotating assembly 120 to operate synchronously according to the motion data to provide a force opposite to the tilt direction of the receiving module. When the first rotating assembly 110 drives the receiving module to roll, the second rotating assembly 120 drives the receiving module to pitch. Alternatively, when the first rotating assembly 110 drives the receiving module to pitch, the second rotating assembly 120 drives the receiving module to roll.

In this embodiment, the sensor module 300 is provided in the accommodation space of the transport equipment to acquire the motion data of the transport equipment. The control module controls the first rotating assembly 110 and the second rotating assembly 120 to operate synchronously according to the motion data acquired by the sensor module to control the receiving module to roll and pitch, that is, to realize two degrees of freedom. In this way, a force opposite to the tilt direction of the receiving module is provided to keep the receiving module stable to achieve a self-balancing vibration damping effect. The motion data of the transport equipment specifically includes attitude data such as speed, displacement, and acceleration, and vibration data, such as tilt angle deviation. The motion data of the transport equipment is not limited herein.

It is worth noting that in this embodiment, the transport equipment can be any vehicle, ship, or yacht, and the self-balancing vibration damping system provided in this embodiment can be applied to any vehicle without any restriction. Of course, to explain the technical solution of the present disclosure clearly and in detail, the vehicle is taken as an example to explain the transport equipment.

The vehicle includes a wheel set, a chassis, and a suspension system. The wheel set specifically includes four wheels and suspension arms and other components configured to connect the wheels and will not be described herein. The suspension system is provided on the wheel set through the chassis. Further, the self-balancing vibration damping system is provided on the suspension system for carrying a seat, a stretcher, a storage box, or any other device, which is not limited herein. The self-balancing vibration damping system is configured to reduce the vibration of the device due to an external force, such that the device can automatically maintain a stable state. It is worth noting that the self-balancing vibration damping system is directly or indirectly provided on the suspension system. For example, a carriage is provided on the suspension system, an interior space of the carriage forms the accommodation space, and the self-balancing vibration damping system is provided on the bottom wall of the interior space of the carriage. The present disclosure does not limit the specific position of the self-balancing vibration damping system, and the self-balancing vibration damping system can be flexibly provided according to actual use needs.

Further, in this embodiment, the self-balancing vibration damping system includes a support module and passive vibration damping module 200. Specifically, the support module is located below the receiving module, and the first rotating assembly 110 and the sensor module 300 are provided on the support module. The passive vibration damping module 200 is provided on the support module, and the first rotating assembly 110 and the second rotating assembly 120 are connected in series with the passive vibration damping module 200.

Specifically, when the vehicle is forced to pitch, roll, or inertially move due to an external force, the suspension system of the vehicle damps part of a high-frequency vibration of the chassis. Since the support module is provided on the suspension system, a low-frequency vibration and some undamped high-frequency vibration are transmitted to the support module through the suspension system. The passive vibration damping module 200 provided on the support module effectively reduces some of the remaining high-frequency vibrations. Further, the sensor module 300 acquires motion data of the support module, that is, the motion data of the vehicle in real-time, and actively controls the first rotating assembly 110 and the second rotating assembly 120 of the active vibration damping module 100 to operate according to the motion data. The first rotating assembly 110 and the second rotating assembly 120 are connected and assist to control the roll and pitch of the receiving module. In this way, a force opposite to the tilt direction of the support module is provided for the support module. The two forces cancel each other to avoid a synchronous posture change of the support module with the support module to ensure that the support module always maintains a stable state. Therefore, the seat, storage box, stretcher, or other device provided on the receiving module is always stable. In the present disclosure, the active vibration damping module 100 and the passive vibration damping module 200 are provided on the receiving module and/or the support module to form the self-balancing vibration damping system, which effectively reduces the high-frequency low-amplitude vibration and low-frequency high-amplitude vibration of the transport equipment, thus achieving a self-balancing vibration damping effect and keeping the transport equipment running stably.

In this embodiment, as shown in FIGS. 1 to 7, the receiving module includes first platform 410, and the support module includes second platform 420 and third platform 430. The second platform 420 is located between the first platform 410 and the third platform 430. The sensor module 300 is provided at one end of the third platform 430 toward the second platform 420, and the passive vibration damping module 200 is provided between the second platform 420 and the third platform 430.

It is worth noting that the first platform 410, the second platform 420, and the third platform 430 are parallel in an initial balanced state. When the vehicle is running on an uneven road, the chassis and the suspension system will shake. In this case, the active vibration damping module 100 and the passive vibration damping module 200 are connected and coordinated to adjust the tilt range between the three platforms, such that the seat, storage box, stretcher, or other device provided on the first platform 410 is always stable.

More importantly, in this embodiment, as shown in FIGS. 1 to 7, the third platform 430 is provided on the suspension system. Preferably, the passive vibration damping module 200 is composed of spring dampers featuring a wide load range, low natural frequency, good vibration isolation effect, compact structure, small overall size, convenient mounting, long service life, and strong adaptability to the working environment. Of course, the passive vibration damping module 200 can also be composed of any other spring damping members, which are not limited herein. In addition, the specific number of spring dampers is not limited herein, and it can be flexibly set according to actual use needs. When the spring dampers are provided between the second platform 420 and the third platform 430, they can effectively reduce some of the remaining high-frequency low-amplitude vibration not reduced by the suspension system, thus effectively improving the stability of the seat, etc.

As shown in FIG. 1, one end of each of the spring dampers is fixed to the third platform 430, and the position of the second platform 420 corresponding to the spring damper is provided with top support 210 for fixing the other end of the spring damper facing the second platform 420. The design improves the structural stability of the spring damper during use, thus improving the damping performance of the spring damper. Preferably, the top support 210 is provided at an end of the second platform 420 away from the third platform 430. The position of the second platform 420 corresponding to the top support 210 is provided with a hole, and the spring damper penetrates the hole to be fixed to the top support 210. The structure expands the contact range between the spring damper and the second platform 420, but it is not limited herein, and any structure that can expand the contact range is within the protection scope of the present disclosure.

In this embodiment, as shown in FIG. 1, the first rotating assembly 110 and the second rotating assembly 120 are provided between the first platform 410 and the second platform 420 to adjust the tilt magnitude of the first platform 410 relative to the second platform 420 to keep the first platform 410 stable. The first rotating assembly 110 and the second rotating assembly 120 are active vibration reduction measures controlled by the sensor module 300. They are connected in series to effectively reduce low-frequency high-amplitude vibration. Further, the first rotating assembly 110 and the second rotating assembly 120 are connected in series with the spring dampers to reduce the vibration of the seat or other devices. That is to say, in this embodiment, the first rotating assembly 110 and the second rotating assembly 120, together with the spring dampers and the suspension system of the vehicle, form a self-balancing vibration damping pattern based on passive vibration damping, active/passive vibration damping, and self-balancing, which greatly improves the stability and comfort of the vehicle during running.

Figure 2:
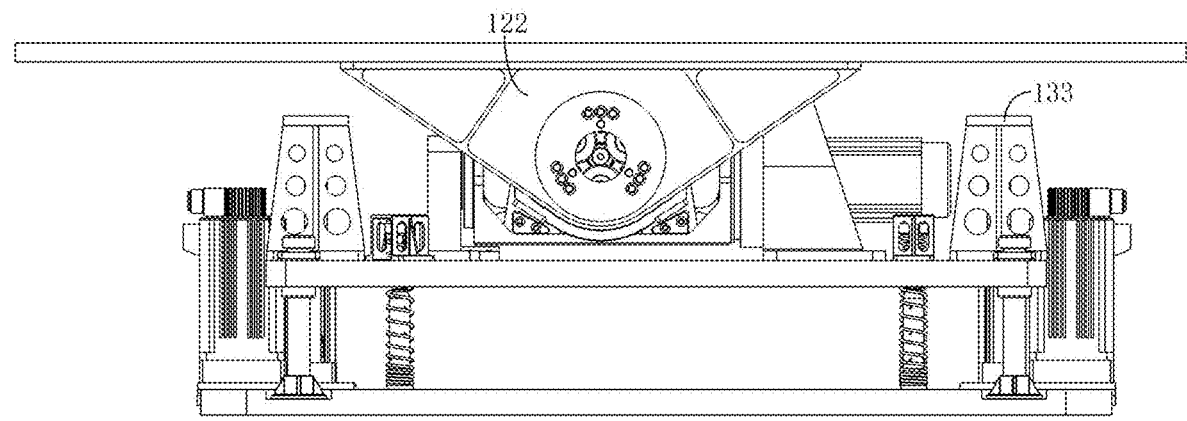
FIG. 2 is a structural diagram of the self-balancing vibration damping system shown in FIG. 1 in a state.
Figure 3:
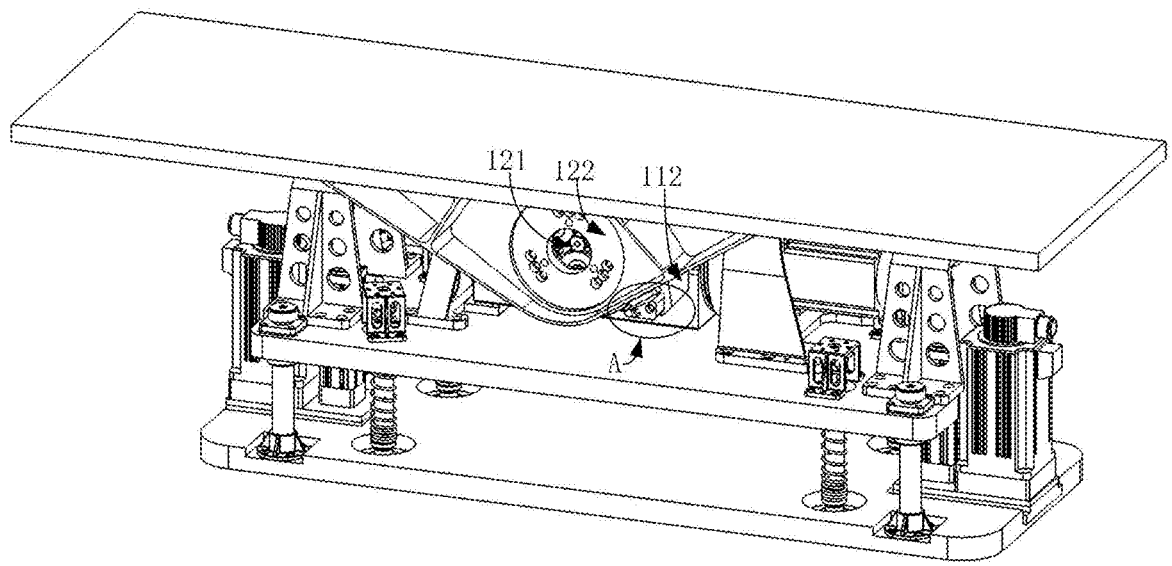
FIG. 3 is a structural diagram of the self-balancing vibration damping system shown in FIG. 1 in another state.

In this embodiment, the control module is signal-connected and/or electrically connected with the sensor module 300, the first rotating assembly 110, and the second rotating assembly 120. Specifically, as shown in FIGS. 1 to 3, the first rotating assembly 110 includes first motor 111, first flange seat 112, and rotating pair support 113. In this embodiment, the first motor 111 and the rotating pair support 113 are provided on the support module, that is, the second platform 420, in any fixed manner, which is not limited herein.

The first flange seat 112 has one end provided at the driving end of the first motor 111 and the other end hinged to the rotating pair support 113. Preferably, the first flange seat 112 includes first flange 1122, second flange 1123, and mounting plate 1124. The first flange 1122 is provided at the driving end of the motor, the second flange 1123 is hinged to the rotating pair support 113, and the mounting plate 1124 is butted with the first flange 1122 and the second flange 1123. In this way, the first motor 111 runs to drive the mounting plate 1124 to rotate, and the rotating pair support 113 makes the mounting plate 1124 rotate stably.

Figure 5:
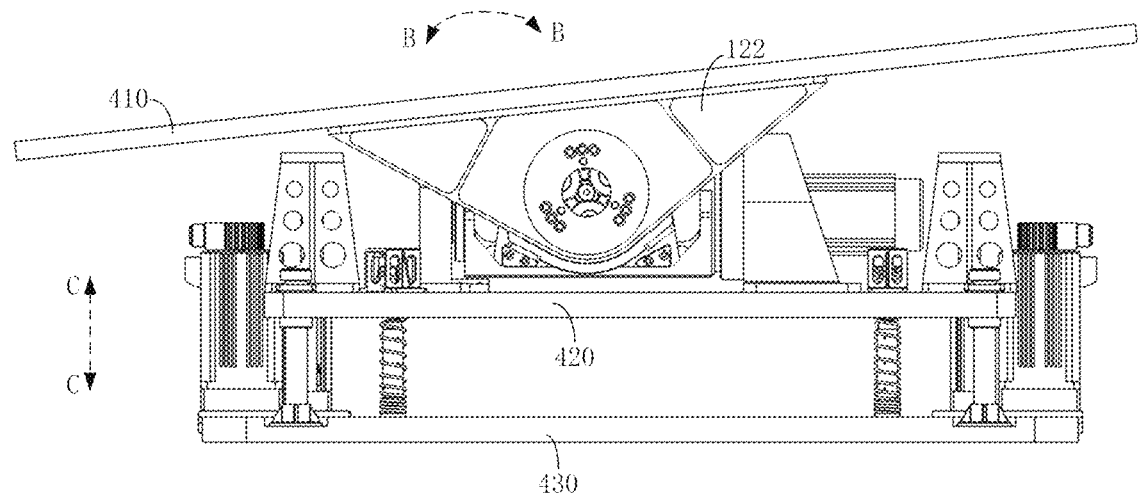
FIG. 5 is a structural diagram of the self-balancing vibration damping system shown in FIG. 1 in another state.
Figure 6:
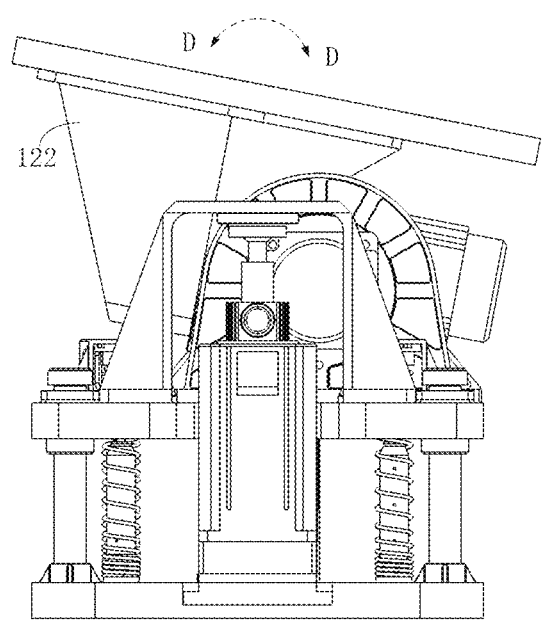
FIG. 6 is a structural diagram of the self-balancing vibration damping system shown in FIG. 1 in another state.
Figure 7:
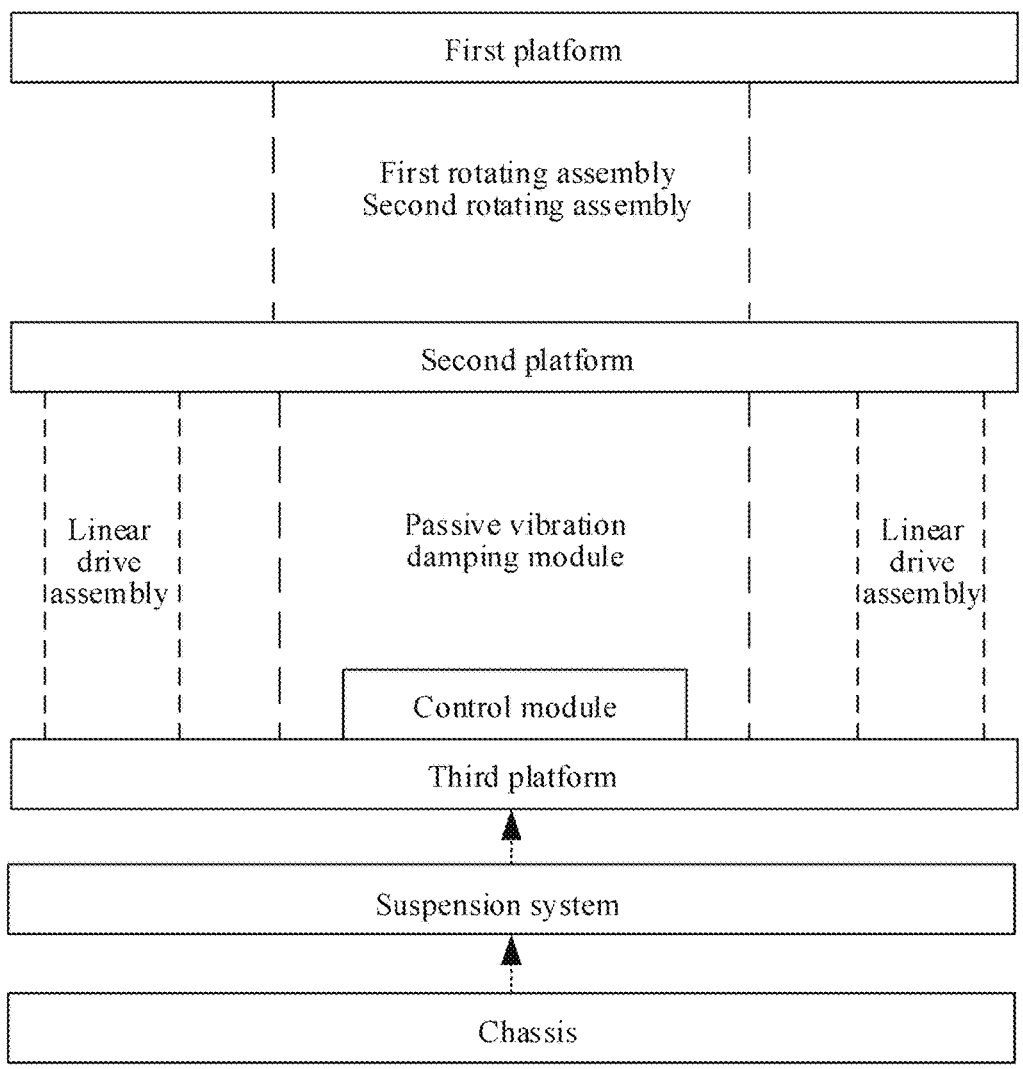
FIG. 7 shows a kinetic model of the self-balancing vibration damping system shown in FIG. 1.

Further, the second rotating assembly 120 includes second motor 121 and second flange seat 122. The second motor 121 is provided on the mounting plate 1124 of the first flange seat 112, and the second flange seat 122 is provided at a driving end of the second motor 121 and butted with the receiving module, that is, the first platform 410. The first motor 111 and the second motor 121 are signal-connected and/or electrically connected with the control module, and the rotation axes of the first motor 111 and the second motor 121 are perpendicular to each other. In this way, as shown in FIGS. 5 and 6, after the sensor module 300 acquires the motion data of the third platform 430, the control module controls the first motor 111 to drive the first platform 410 to roll in a left-right direction D-D and the second motor 121 to drive the first platform 410 to pitch in a front-back direction B-B according to the motion data. Alternatively, the first motor 111 drives the first platform 410 to pitch in the front-back direction B-B, and the second motor 121 drives the first platform 410 to roll in the left-right direction D-D. These two solutions both are within the protection scope of the present disclosure. In this way, the tilt magnitude of the first platform 410 in any direction can be effectively adjusted, such that the first platform is always stable.

It is worth noting that in this embodiment, the first motor 111 and the second motor 121 may include, but are not limited to, a simple forward or reverse rotation motor and may further include a combination of a forward or reverse rotation motor and a reducer. Alternatively, in this embodiment, the configuration of the first rotating assembly 110 and the second rotating assembly 120 is not limited to this. They can also be any other driving members configured to provide rotation, and their specific configuration can be arbitrarily set according to actual use needs, which is not limited herein.

It is worth noting that in this embodiment, the first rotating assembly 110 drives the receiving module to move by driving the second rotating assembly 120 to rotate, and the second rotating assembly 120 drives the receiving module to move independently. Therefore, the receiving module can pitch synchronously while rolling. No matter which direction the receiving module inclines, the first rotating assembly 110 and the second rotating assembly 120 can provide a force opposite to the tilt direction, thus greatly improving the balance effect of the receiving module.

Figure 4:
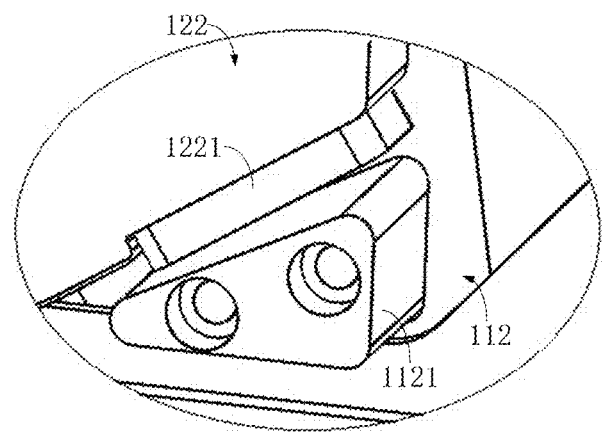
FIG. 4 is a detail of A shown in FIG. 3.

Further, in this embodiment, as shown in FIGS. 2 and 3, the second flange seat 122 is configured as an isosceles triangle and includes a bevel butted with the first platform 410 and two symmetrical surfaces synchronously rotating with the second motor 121. The rotational directions of the first flange seat 112 and the second flange seat 122 are perpendicular to each other. To protect the rotational strokes of the two flange seats and avoid mutual interference between the two flange seats, as shown in FIG. 4, the first flange seat 112 is provided with stop element 1121, and the second flange seat 122 is provided with anti-collision element 1221. When the first flange seat 112 and the second flange seat 122 rotate, the stop element 1121 and the anti-collision element 1221 are butted and mated with each other to restrict the continuous rotation of the first flange seat 112 and the second flange seat 122. For example, the stop element 1121 is configured as a triangular element, the anti-collision element 1221 is configured as a square element, and a bevel of the stop element 1121 is butted and mated with the anti-collision element 1221. The embodiment does not limit the specific configurations of the stop element 1121 and the anti-collision element 1221, and any configurations that can realize stroke protection are within the protection scope of the present disclosure.

Further, in this embodiment, as shown in FIG. 1, the active vibration damping module 100 includes two linear drive assemblies 130. Specifically, the two linear drive assemblies 130 are symmetrically arranged on two opposite sides of the support module and are connected in parallel with the passive vibration damping module 200, that is, the spring dampers. Each linear drive assembly 130 includes electric push rod 131 and ball joint 132. The electric push rod 131 includes drive body 1311 signal-connected and/or electrically connected with the control module and telescopic rod 1312 connected with the drive body 1311 in a driving manner. The two drive bodies 1311 are symmetrically arranged on two opposite sides of the third platform 430. Positions of the second platform 420 corresponding to the two telescopic rods 1312 are respectively provided with ball joint supports 133. The ball joint 132 is provided at a free end of the telescopic rod 1312 and butted with the ball joint support 133. Preferably, the two ball joint supports 133 are provided at an end of the second platform 420 away from the first platform 410 and are located on two opposite sides of the second platform 420. The positions of the second platform 420 corresponding to the ball joint supports 133 are hollow, which eases the penetration of the telescopic rods 1312.

In this embodiment, under the control of the control module, the two linear drive assemblies 130 effectively reduce the low-frequency high-amplitude vibration of the device such as the seat. The two linear drive assemblies act between the second platform 420 and the third platform 430 and are connected in parallel with the spring dampers to reduce the vibration of the seat or other devices.

Further, in this embodiment, as shown in FIGS. 1 and 5, four corners of the third platform 430 are further provided with four guide rods 510. Positions of the second platform 420 corresponding to the four guide rods 510 are respectively provided with four sliding holes. The four guide rods 510 are slidably connected with the four sliding holes to adjust the distance of the second platform 420 moving in an up-down direction C-C under the action of the passive vibration damping module 200, namely the spring dampers. Further, to prevent the second platform 420 from detaching from a free end of each of the guide rods 510 during up-down movement, a stop portion 520 is provided at the free end of each of the guide rods 510. The stop portion 520 is butted and mated with the sliding hole to prevent the second platform 420 from detaching from the free end of the guide rod 510 to make the second platform 420 move stably.

It is worth noting that the electric push rod 131 is configured to drive the second platform 420 to move up and down along the guide rod 510 to assist the spring damper in active and passive vibration damping, thus improving the vibration damping effect. In this embodiment, the ball joint 132 can effectively prevent the second platform 420 from being stuck during up-down movement, thus improving the movement flexibility of the second platform 420.

In this embodiment, as shown in FIGS. 1 to 7, a specific process to keep the seat or other device inside the vehicle in a balanced state is described as follows.

When the vehicle is running on an uneven road, as shown in FIGS. 5 and 6, the vehicle pitches in the front-back direction B-B, rolls in the left-right direction D-D, and longitudinally moves in the up-down direction due to an external force.

Further, the suspension system of the vehicle damps some of the high-frequency vibrations of the chassis.

Further, the third platform 430 is provided on the suspension system, and the low-frequency vibration and some undamped high-frequency vibration are transmitted to the third platform 430 through the suspension system. The spring dampers provided between the second platform 420 and the third platform 430 and the linear drive assemblies 130 jointly reduce some of the remaining high-frequency vibration and low-frequency up-down vibration.

Further, after the third platform 430 is vibrated, the sensor module 300 measures the motion data of the third platform 430 relative to a balanced state, such as attitude angle deviation and acceleration change, and transmits the motion data to the control module in real-time. The first platform 410 is required to be balanced all the time, that is, the attitude of the first platform 410 should not change with the attitude of the second platform 420 and the third platform 430. For this reason, the control module calculates parameters such as speed, displacement, and acceleration that the first rotating assembly 110, the second rotating assembly 120, and the linear drive assemblies 130 need to output to keep the first platform 410 balanced based on an active and passive vibration damping algorithm of a series/parallel robot. The first rotating assembly 110, the second rotating assembly 120, and the linear drive assemblies 130 perform corresponding actions according to commands of the control module to realize the self-balance of the first platform 410 and realize the isolation of low-frequency high-amplitude vibration and attitude compensation. The linear drive assemblies 130 are connected in parallel with the spring dampers, and the first rotating assembly 110 and the second rotating assembly 120 are connected in series with the linear drive assemblies 130. Therefore, when the first rotating assembly 110, the second rotating assembly 120, and the linear drive assemblies 130 perform actions synchronously, the isolation of the high-frequency low-amplitude vibration can be achieved through the active and passive vibration damping algorithm.

Specifically, the attitude compensation of the first platform 410 relative to the second platform 420 and the third platform 430 means that the third platform 430 moves with the suspension system, and the second platform 420 moves with the third platform 430 accordingly. When the chassis pitches in the back-forth direction, rolls in the left-right direction, and moves in the up-down direction in a relatively balanced state due to vibration, bumps, or other reasons, the first platform 410 always maintains a balanced state under the action of the self-balancing vibration damping system. The design effectively isolates the low-frequency high-amplitude vibration and high-frequency low-amplitude vibration and achieves self-balancing vibration damping, thus keeping the transport equipment in a stable running state all the time.

Figure 10:
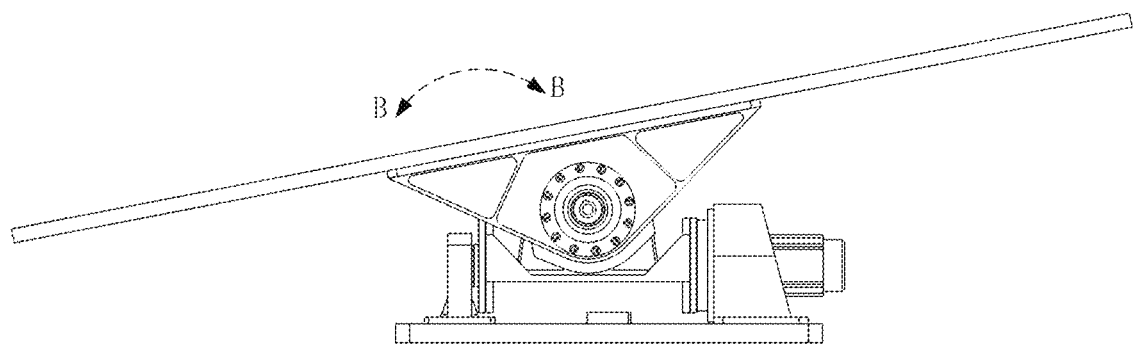
FIG. 10 is a structural diagram of the self-balancing vibration damping system shown in FIG. 8 in another state.
Figure 11:
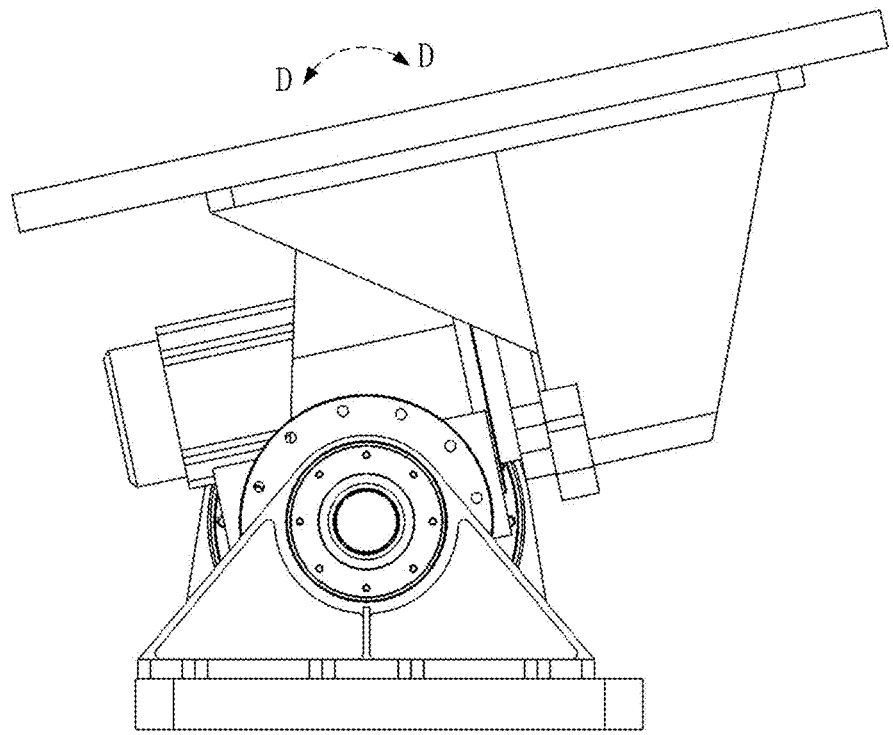
FIG. 11 is a structural diagram of the self-balancing vibration damping system shown in FIG. 8 in another state.
Figure 12:
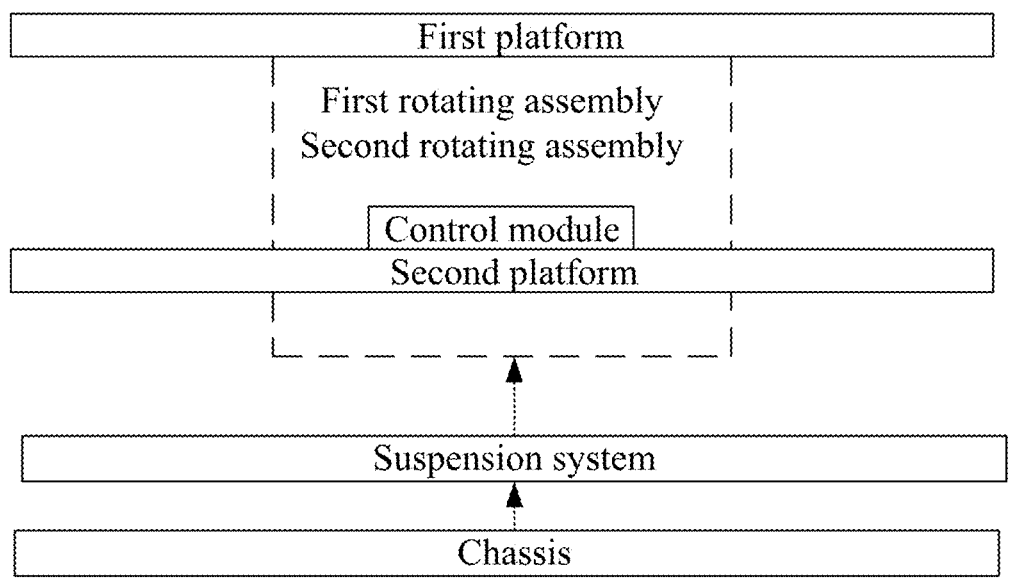
FIG. 12 shows a kinetic model of the self-balancing vibration damping system shown in FIG. 8.

The embodiment applies to situations with poor road conditions. Generally, urban roads are in good condition, and the problems encountered by vehicles during running are mainly inertial motion caused by sudden braking, sharp turning, fast starting, fast stopping, etc. Given this situation, as shown in FIGS. 8 to 12, the present disclosure further provides a self-balancing vibration damping system with two degrees of freedom in another embodiment, which isolates the high-frequency vibration through the suspension system of the vehicle. As shown in FIGS. 10 and 11, the self-balancing vibration damping system only needs to cope with the pitch in the front-back direction B-B and roll in the left-right direction D-D caused by inertial motion to ensure the stability of personnel, seat, other devices, or materials in the vehicle.

Figure 8:
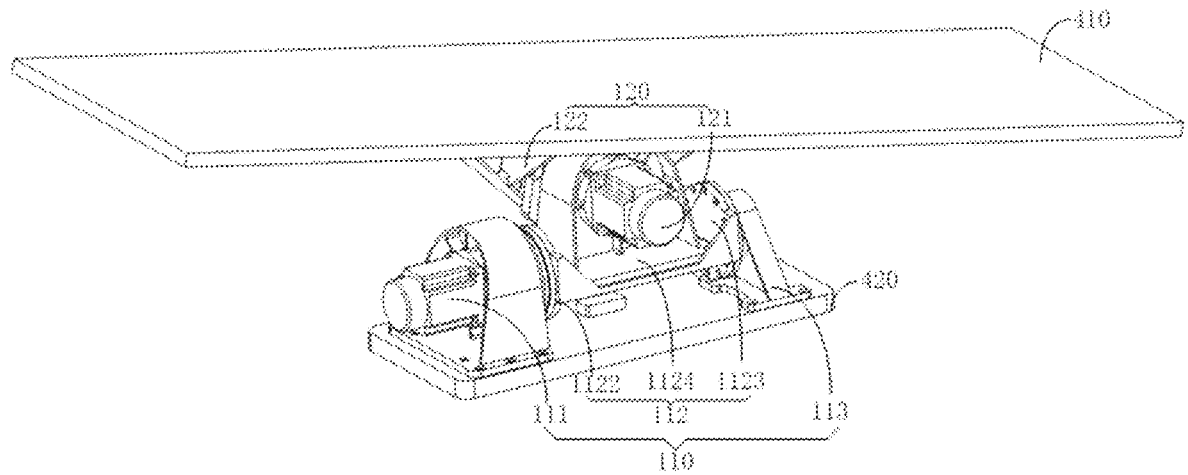
FIG. 8 is a structural diagram of the self-balancing vibration damping system according to another embodiment of the present disclosure.
Figure 9:
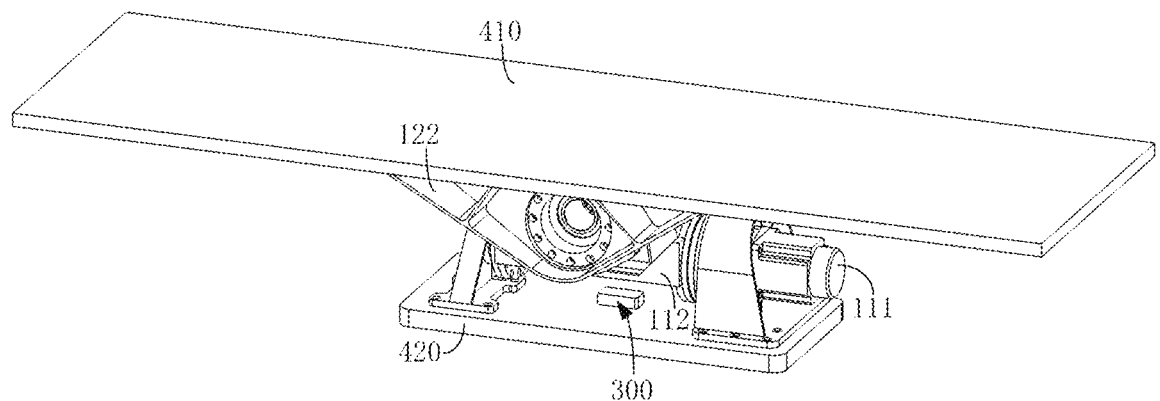
FIG. 9 is a structural diagram of the self-balancing vibration damping system shown in FIG. 8 in a state.

Specifically, compared with the above embodiment, this embodiment retains the first platform 410, the second platform 420, the first rotating assembly 110, and the second rotating assembly 120 in the above embodiment and removes the third platform 430, the passive vibration damping module 200, and the linear drive assemblies 130. The embodiment simplifies the structure, saves costs, and can also be widely used for urban roads in good conditions. As shown in FIG. 8, the structure and working principle of the first rotating assembly 110 and the second rotating assembly 120 are the same as those in the above embodiment. For details, please refer to the description of relevant parts of the above embodiment, which will not be repeated herein.

Figure 13:
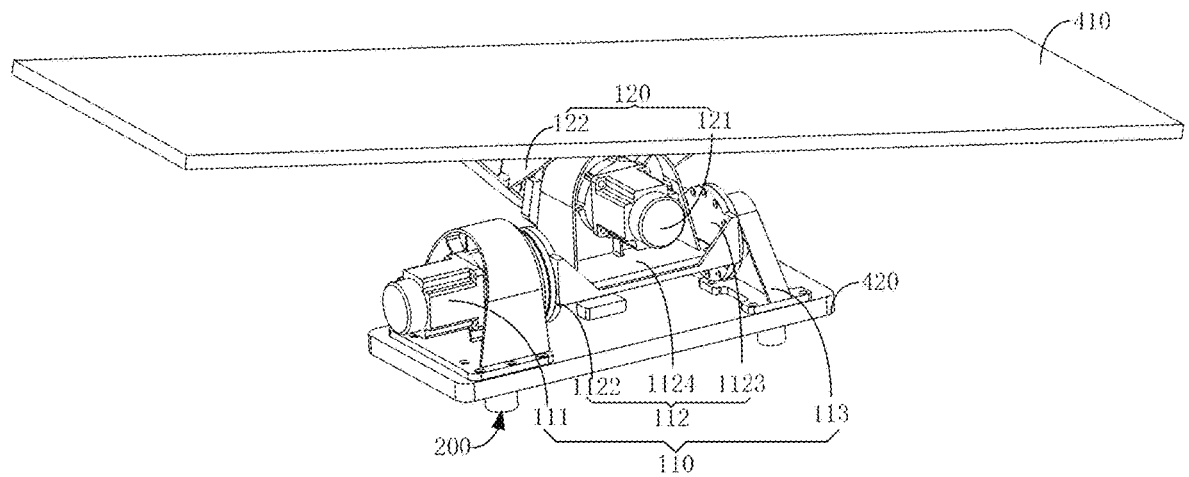
FIG. 13 is a structural diagram of the self-balancing vibration damping system according to another embodiment of the present disclosure.
Figure 14:
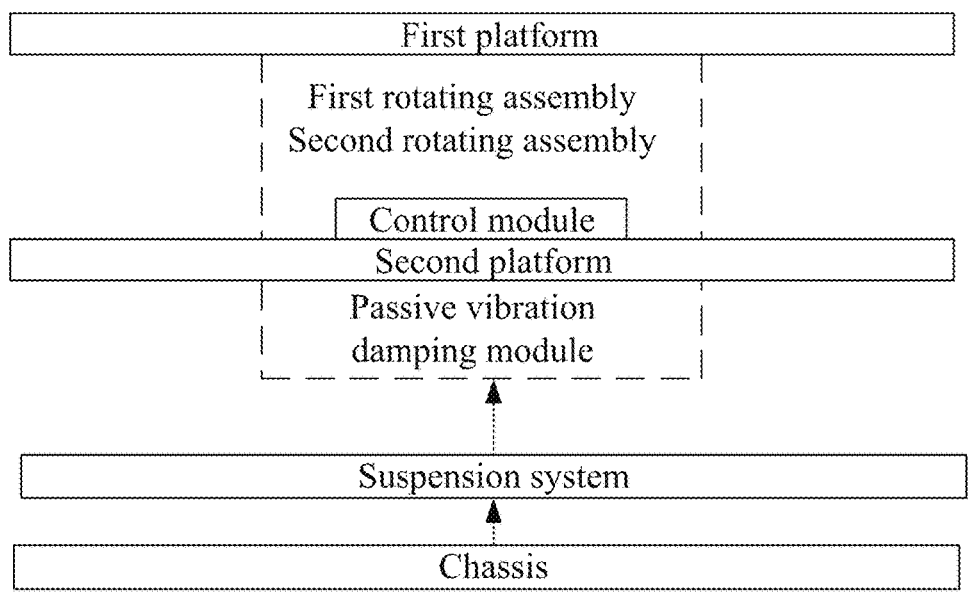
FIG. 14 shows a kinetic model of the self-balancing vibration damping system shown in FIG. 13.

Of course, for some types of vehicles, the chassis will suffer from a large high-frequency vibration due to poor performance of the suspension system or a large engine vibration caused by the engine of the vehicle even when the vehicle is running on an urban road in a good condition. To cope with this situation, as shown in FIGS. 13 and 14, the present disclosure further provides a self-balancing vibration damping system in another embodiment. Based on the self-balancing vibration damping system with two degrees of freedom, the passive vibration damping module 200 is provided at the end of the second platform 420 away from the first platform 410, and the passive vibration damping module 200 is provided at the bottom of the carriage above the suspension system of the vehicle to effectively mitigate the high-frequency vibration.

As shown in FIGS. 13 and 14, the passive vibration damping module 200 can also adopt the technical solution of the spring dampers in the above embodiment. Of course, the passive vibration damping module 200 can also be composed of any other spring damping members including, but not limited to, any passive vibration damping members such as air springs, wire-rope damping springs, and rubber pads, which are within the protection scope of the present disclosure.

As shown in FIGS. 16 to 19, a preferred embodiment provides an active vibration damping seat, which includes seat 1a and self-balancing vibration damping device 2a. The seat 1a is provided on the self-balancing vibration damping device 2a. The self-balancing vibration damping device 2a is suitable to be provided on transport equipment and includes sensor module 21a, active vibration damping module 22a, and control module 23a. The sensor module 21a is configured to acquire motion data of the transport equipment. The control module 23a is configured to receive data of the sensor module 21a and control a motion parameter of the active vibration damping module 22a. The active vibration damping module 22a includes first rotating assembly 221a and second rotating assembly 222a. The first rotating assembly 221a is suitable to be provided on the transport equipment, and the second rotating assembly 222a is provided at a driving end of the first rotating assembly 221a. The first rotating assembly 221a and the second rotating assembly 222a can drive the seat 1a to roll and pitch.

When the first rotating assembly 221a drives the seat 1a to roll, the second rotating assembly 222a drives the seat 1a to pitch. Alternatively, when the first rotating assembly 221a drives the seat 1a to pitch, the second rotating assembly 222a drives the seat 1a to roll.

Figure 15:
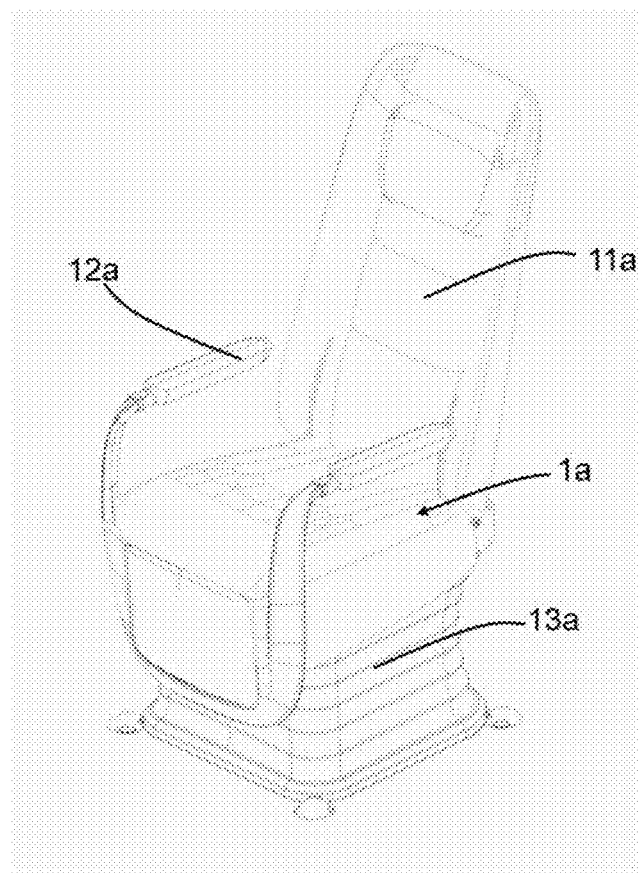
FIG. 15 is a full structural diagram of an active vibration damping seat according to an embodiment of the present disclosure.
Figure 16:
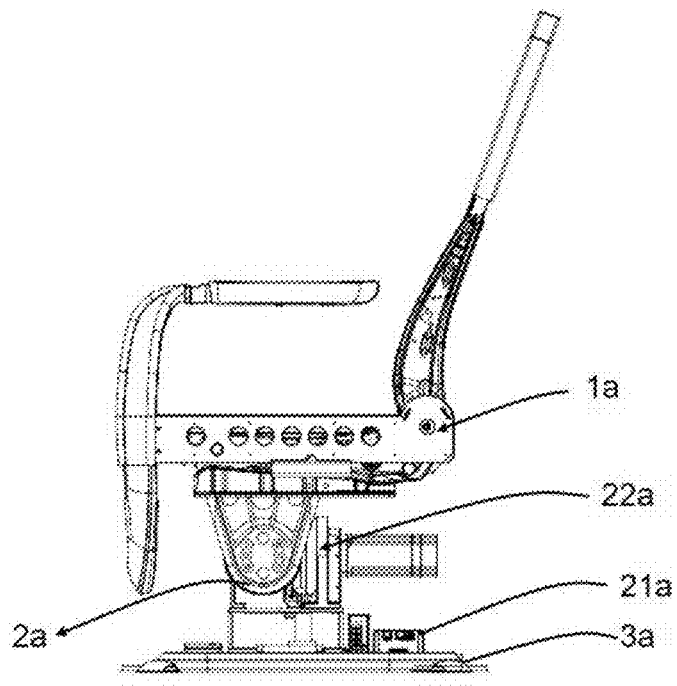
FIG. 16 is a right view of the active vibration damping seat according to the embodiment of the present disclosure.
Figure 17:
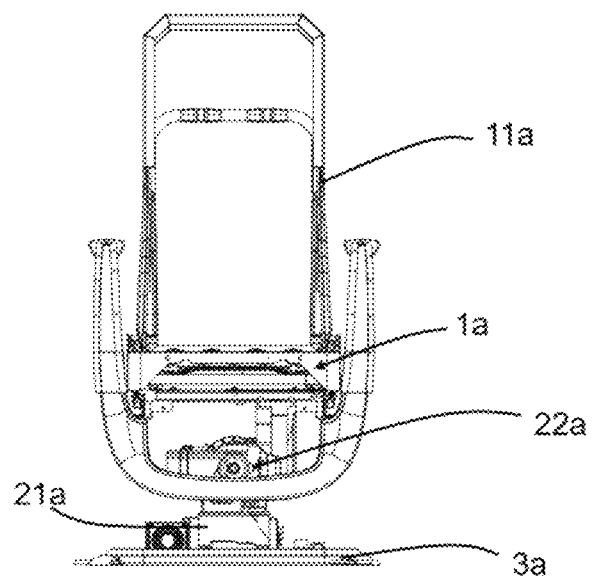
FIG. 17 is a front view of the active vibration damping seat according to the embodiment of the present disclosure.
Figure 18:
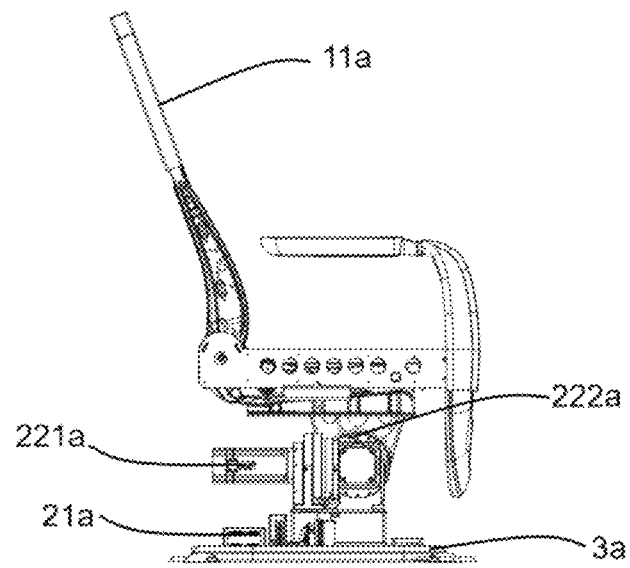
FIG. 18 is a left view of the active vibration damping seat according to the embodiment of the present disclosure.
Figure 19:
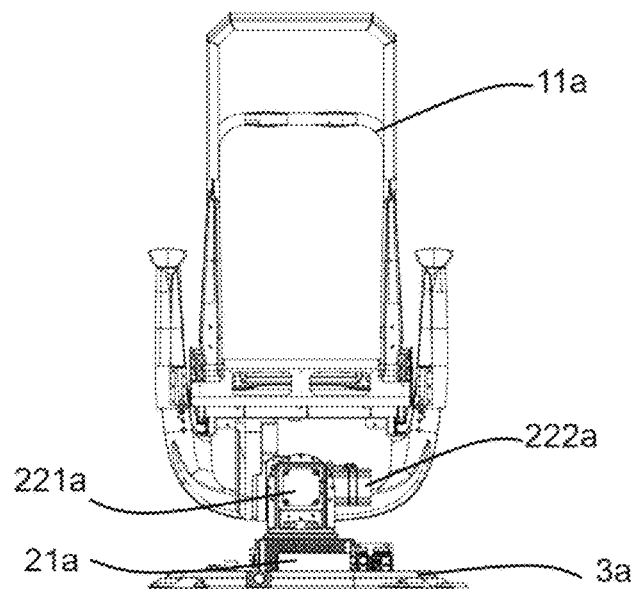
FIG. 19 is a back view of the active vibration damping seat according to the embodiment of the present disclosure.

As shown in FIG. 15, in this embodiment, the seat 1a includes seatback 11a, armrest 12a, and rubber boot 13a. The seatback 11a is provided for a driver to lean back, and it improves the comfort and wrapping performance of the active vibration damping seat. The armrest 12a is provided for the driver to place his/her arm and can carry some articles. The rubber boot 13a internally houses the self-balancing vibration damping device 2a, and it is sealed and waterproof In addition, the rubber boot 13a can shrink with the movement of the self-balancing vibration damping device 2a, so it is not easy to be damaged.

In this embodiment, the sensor module 21a is provided in the self-balancing vibration damping device 2a to acquire the motion data of the transport equipment. The control module 23a controls the first rotating assembly 221a and the second rotating assembly 222a to operate synchronously according to the motion data acquired by the sensor module 21a to control the seat 1a to roll and pitch, that is, to realize two degrees of freedom. In this way, a force opposite to the tilt direction of the seat 1a is provided to keep the seat 1a stable to achieve a self-balancing vibration damping effect. The motion data of the transport equipment specifically includes attitude data such as speed, displacement, and acceleration. In the present disclosure, the active vibration damping device 2a is provided on the seat 1a to form the self-balancing vibration damping system, which effectively reduces the high-frequency low-amplitude vibration and low-frequency high-amplitude vibration of the seat 1a, thus achieving a self-balancing vibration damping effect and keeping the seat 1a running stably.

It is worth noting that in this embodiment, the transport equipment can be any vehicle, ship, or yacht, and the active vibration damping seat provided in this embodiment can be provided in the cab of any vehicle, which is not limited herein. Of course, to explain the technical solution of the present disclosure clearly and in detail, the vehicle is taken as an example to explain the transport equipment.

Further, the sensor module 21a acquires the motion data of the vehicle in real-time and actively controls the first rotating assembly 221a and the second rotating assembly 222a of the active vibration damping module 22a to operate according to the motion data. The first rotating assembly 221a and the second rotating assembly 222a are connected and assist in controlling the roll and pitch of the seat 1a. In this way, a force opposite to the tilt direction of the seat 1a is provided for the seat. The two forces cancel each other to avoid a synchronous posture change of the seat with the vehicle to ensure that the seat always maintains a stable state. Therefore, the active vibration damping seat is always stable.

Figure 20:
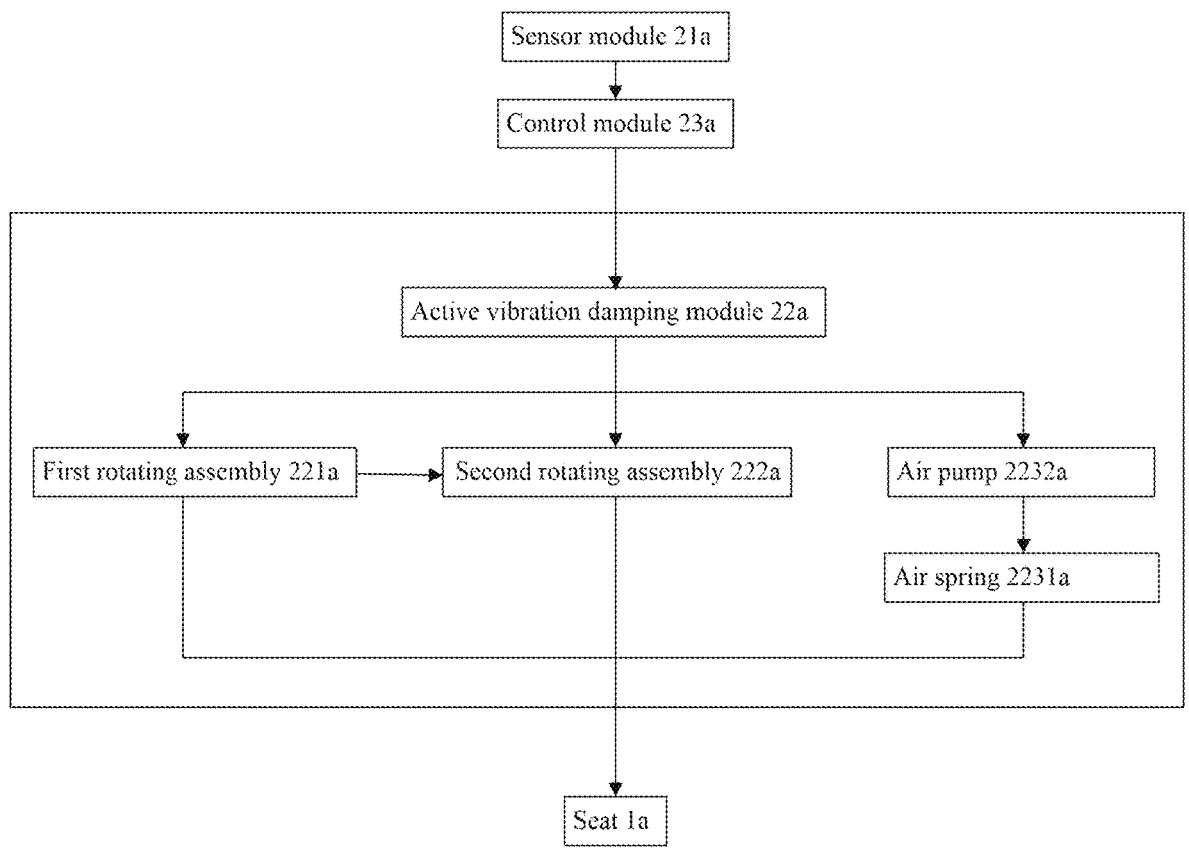
FIG. 20 is a control flowchart of a control module according to the embodiment of the present disclosure.
Figure 21:
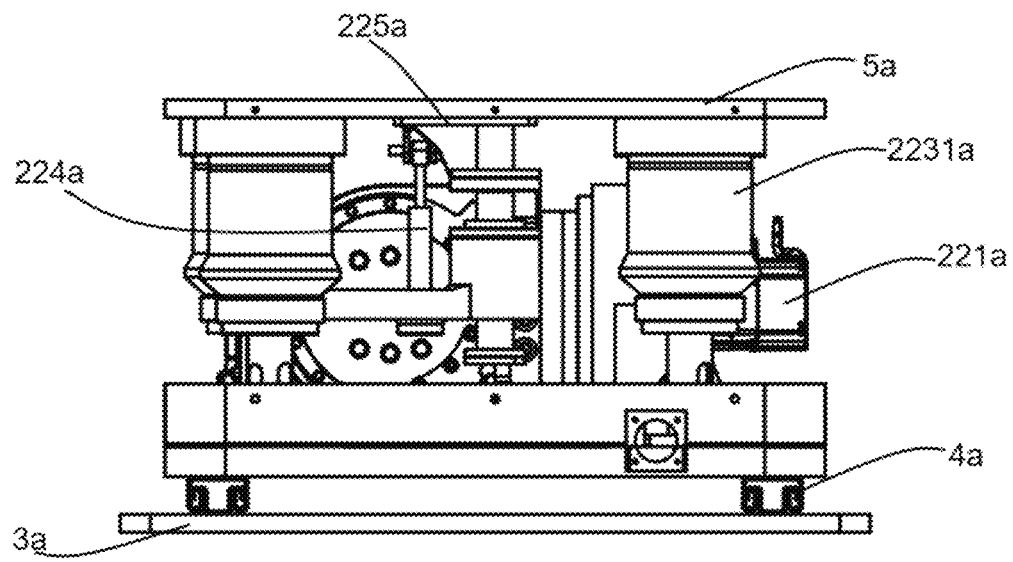
FIG. 21 is a front view of a self-balancing vibration damping device according to an embodiment of the present disclosure.
Figure 22:
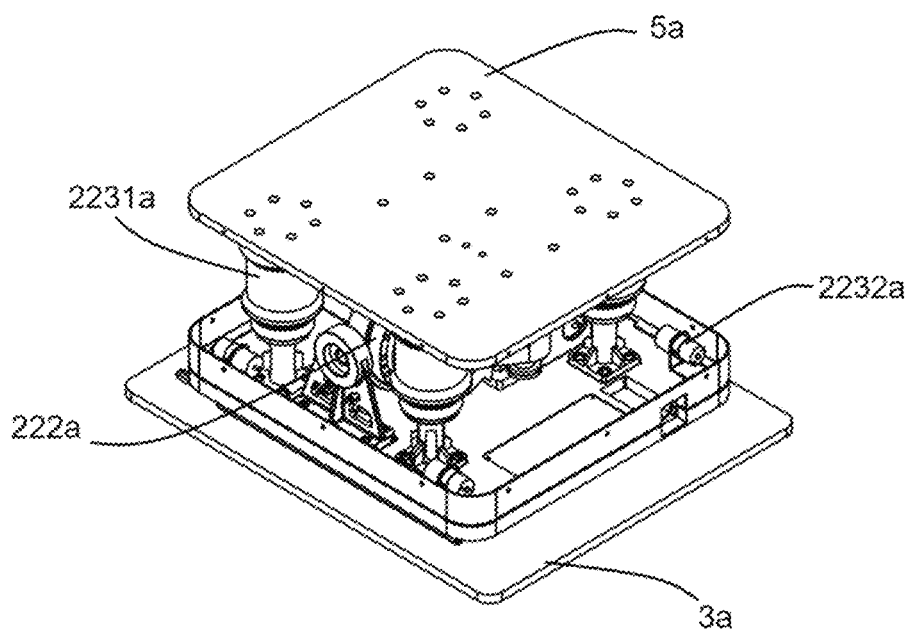
FIG. 22 is a front-side view of the self-balancing vibration damping device according to the embodiment of the present disclosure.
Figure 23:
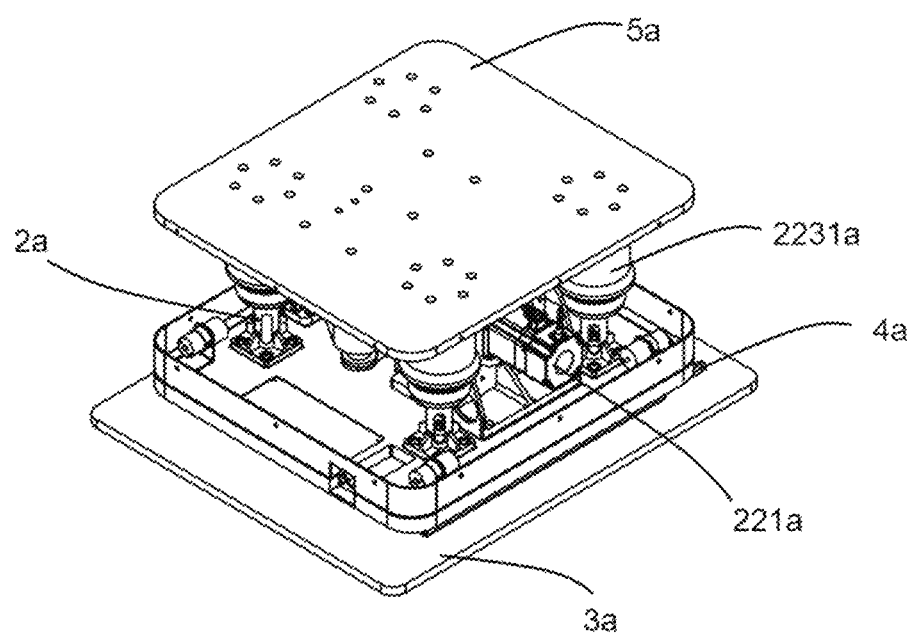
FIG. 23 is a back-side view of the self-balancing vibration damping device according to the embodiment of the present disclosure.
Figure 24:
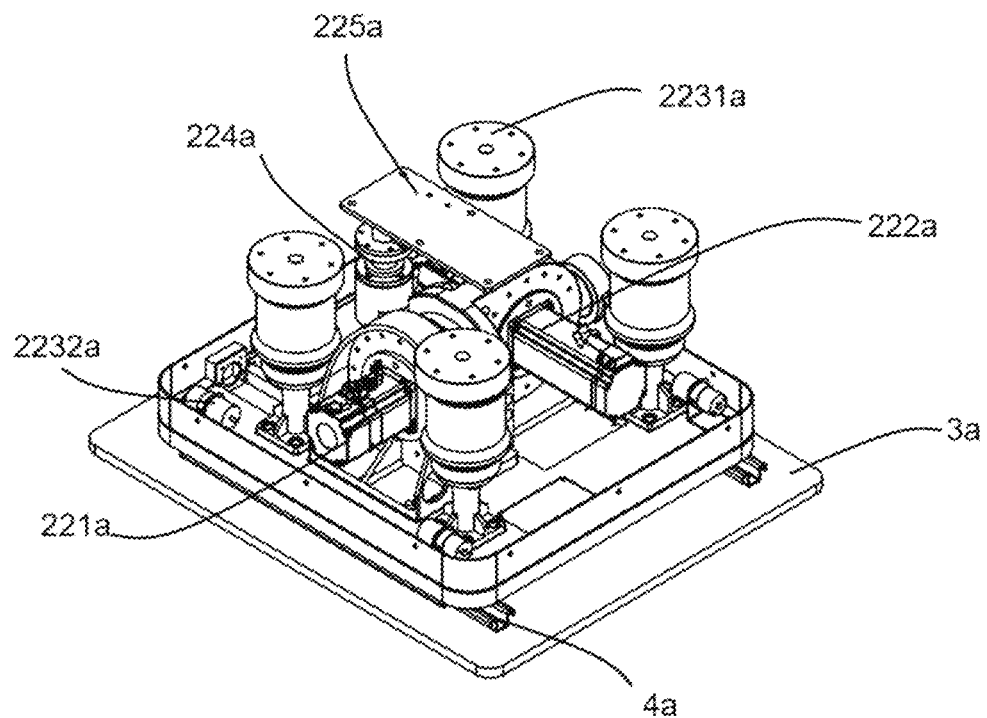
FIG. 24 is a structural diagram of the self-balancing vibration damping device according to the embodiment of the present disclosure.

Specifically, as shown in FIG. 20, when the transport equipment is vibrated, the sensor module 21a measures the motion data of the seat 1a relative to a balanced state, such as attitude angle deviation and acceleration change, and transmits the motion data to the control module 23a in real-time. The seat 1a is required to be balanced all the time, that is, the attitude of the seat 1a should not change with the attitude of the transport equipment. For this reason, the control module 23a calculates parameters such as speed, displacement, and acceleration that the first rotating assembly 221a and the second rotating assembly 222a need to output to keep the seat 1a balanced based on an active and passive vibration damping algorithm of a series/parallel robot. The first rotating assembly and the second rotating assembly 222a perform corresponding actions according to commands of the control module 23a to realize the self-balance of the seat.

What needs to be specifically described is that the first rotating assembly 221a and the second rotating assembly 222a can be independently driven by a motor. The second rotating assembly 222a can be driven by a motor, and because it is provided at the driving end of the first rotating assembly 221a, it can be driven by the first rotating assembly 221a. When only roll or pitch is required, the second rotating assembly 222a can be directly driven by the motor to achieve reverse movement of the seat 1a, ensuring that the seat 1a is always stable. When both roll and pitch are required, according to a command of the control module 23a, the first rotating assembly 221a and the second rotating assembly 222a are combined to rotate to provide an equivalent force opposite to the tilt direction of the vehicle to ensure that the seat 1a is always stable.

As shown in FIGS. 21 to 24, in this embodiment, the active vibration damping module 22a further includes elastic damping assemblies 223a. Each of the elastic damping assemblies 223a has a top end provided on the seat 1a and a bottom end fixed on a mounting plane of the self-balancing vibration damping device 2a and is configured to exert a force on the seat 1a in a height direction.

The mounting plane of the self-balancing vibration damping device 2a can be the transport equipment or a bottom surface of the active vibration damping seat. When the mounting plane of the self-balancing vibration damping device 2a is the bottom surface of the active vibration damping seat, the self-balancing vibration damping device 2a and the elastic damping assemblies 223a are internal components of the active vibration damping seat.

It is worth noting that the control module 23a can control the elastic damping assemblies 223a to actively drive the seat 1a to move up and down in the height direction and exert a force on the seat 1a in the height direction. Meanwhile, the control module 23a can also control the elastic damping assemblies 223a to assist the first rotating assembly 221a and the second rotating assembly 222a to control the roll and pitch of the seat 1a, thus improving the damping performance of the active vibration damping seat.

Specifically, as shown in FIG. 20, when the vehicle pitches in the front-back direction, rolls in the left-right direction, and inertially moves due to an external force, the suspension system of the vehicle damps some of the high-frequency vibration of the chassis. The self-balancing vibration damping device 2a is provided on the chassis. The low-frequency vibration and part of the undamped high-frequency vibration are transmitted to the self-balancing vibration damping device 2a through the suspension system. The elastic damping assemblies 223a provided on the self-balancing vibration damping device 2a actively drive the seat 1a to move up and down in the height direction according to the high-frequency vibration to effectively damp some of the remaining high-frequency vibration, ensuring that the seat 1a is stable in the height direction. When the vehicle suddenly brakes, the seat 1a receives a huge force of forward tilt due to inertia. The elastic damping assemblies 223a assist the first rotating assembly 221a to provide a force opposite to the forward tilt direction for the seat 1a. Specifically, when the vehicle suddenly brakes, the front end of the seat 1a is subjected to an inertial force of downward movement, causing the seat 1a to tilt in the front-back direction. At this time, the control module 23a controls the motor to drive the first rotating assembly 221a to drive the seat 1a to rotate backward, thus keeping the front and rear ends of the seat 1a stable. The elastic damping assemblies 223a at the front end increase the lift force in the height direction until it is greater than the lift force of the elastic damping assemblies 223a at the rear end in the height direction. In this way, the first rotating assembly 221a controls the seat 1a to pitch, such that the seat 1a quickly and sensitively keeps its front and rear ends stable. This is also the case when the vehicle rolls. The elastic damping assemblies 223a at the left and right ends have different lift forces in the height direction to assist the second rotating assembly 222a to control the seat 1a to roll.

It is worth noting that the specific number of the elastic damping assemblies 223a is not limited, and it can be flexibly set according to actual use needs.

Preferably, there are four elastic damping assemblies 223a arranged at four corners of the seat 1a.

The four elastic damping assemblies are distributed at the four corners of the seat 1a to effectively reduce some of the remaining high-frequency low-amplitude vibrations and also enable the seat 1a to make the most sensitive response to effectively improve the stability of the active vibration damping seat.

Further, each of the elastic damping assemblies 223a includes air spring 2231a. The air spring 2231a has a top end provided on the seat 1a and a bottom end provided on the mounting plane of the self-balancing vibration damping device 2a.

The air spring 2231a has an excellent nonlinear hard feature and can effectively limit the amplitude of the vibration, avoid resonance, and prevent impact. It has many advantages, such as a wide load range, low natural frequency, good vibration isolation effect, compact structure, small overall size, convenient mounting, long service life, and strong adaptability to the working environment. Therefore, the air spring 2231a is preferably selected to control the degree of freedom of the seat 1a in the height direction. In addition, since the medium adopted by the air spring 2231a is mainly air, it is easy to implement active control.

It is worth noting that the elastic damping assemblies 223a can also be any other spring damping assemblies, which is not limited herein.

Further, each of the elastic damping assemblies 223a includes air pump 2232a. The air pump 2232a is connected with the air spring 2231a, and the air pump 2232a is also connected with the control module 23a. The control module 2a3 controls the air pump 2232a to work based on the data of the sensor module 21a to control the air spring 2231a to drive the seat 1a to move in the height direction.

As shown in FIG. 20, in this embodiment, the control module 23a inflates an air bag in the air spring 2231a through the air pump 2232a to control the movement of the air spring. Specifically, when the vehicle suddenly brakes, the front end of the seat 1a is subjected to an inertial force of downward pitch, causing the seat 1a to tilt in the front-back direction. The control module 23a controls the air pump 2232a to fill the air bag of the air spring 2231a at the front end with compressed air to form a compressed air column. The air pressure of the air bag continues to increase to raise the front end of the seat 1a, such that the seat 1a keeps balanced in the front-back direction.

Further, the active vibration damping module 22a includes telescopic rod 224a. The telescopic rod 224a has one end connected with the seat 1a and the other end connected with the mounting plane of the self-balancing vibration damping device 2a and is configured to control the movement of the seat 1a within a limited range when the active vibration damping module 22a controls the seat 1a to move.

In this embodiment, the telescopic rod 224a connects the seat 1a with the self-balancing vibration damping device 2a to prevent the seat 1a from detaching from the self-balanced device 2a when the active vibration damping module 22a drives the seat 1a to move to control the movement of the seat 1a within an effective range.

Specifically, when the vehicle suddenly brakes, in order to maintain the stability of the seat 1a, the control module 23a controls the active vibration damping module 22a to pitch relative to the seat 1a. Due to the serious forward inclination of the vehicle, the pitch amplitude of the active vibration damping module 22a is large. The telescopic rod 224a is required to be extended and retracted in the up-down direction with the pitch of the seat 1a. The seat 1a is closely connected with the self-balancing vibration damping device 2a to prevent the seat 1a from detaching from the self-balancing vibration damping device 2a in the up-down direction due to a large pitch amplitude.

Further, the telescopic rod 224a is located outside the driving end of the second rotating assembly 222a. The position of the seat 1a corresponding to the telescopic rod 224a is provided with mounting plate 225a for fixing one end of the telescopic rod 224a toward the seat 1a.

In this embodiment, the mounting plate 225a can improve the structural stability of the telescopic rod 224a during use, thus ensuring the vibration reduction performance of the telescopic rod. Preferably, the position of the seat 1a corresponding to the mounting plate 225a is provided with a hole, and the telescopic rod 224a penetrates the hole to be fixed to the mounting plate 225a. The mounting plate 225a is butted and mated with the hole to prevent the seat 1a from detaching from a free end of the telescopic rod 224a to make the seat 1a move stably. This configuration can expand the contact range between the telescopic rod 224a and the seat 1a, but it is not limited to this, and any configuration that can expand the contact range is within the protection scope of the present disclosure.

Further, the active vibration damping seat includes base 3a. The self-balancing vibration damping device 2a is provided on the base 3a, and the base 3a is suitable to be provided on the transport equipment.

The active vibration damping seat further includes slide rail 4a provided under the base 3a for adjusting the distance between the base 3a and the transport equipment.

In this embodiment, the self-balancing vibration damping device 2a is provided on the base 3a, and the active vibration damping seat is integrally provided on the transport equipment. The slide rail 4a is an indispensable and important mechanical part for controlling the active vibration damping seat. The slide rail 4a is also an intermediate part with a support function for connecting the seat with the transport equipment. The front-back adjustment of the slide rail 4a is a common function of the seat to control the adjustment function of the seat.

Specifically, the self-balancing vibration damping device 2a and the seat 1a are provided on the base 3a after assembly, and the active vibration damping seat is provided on the slide rail 4a in a cab of the vehicle through the base 3a. The driver can adjust the front-back position of the base 3a by controlling the slide rail 4a according to his/her own need to position the seat properly and keep himself/herself in a comfortable position in the cab. The slide rail 4a also has a safety function. When the transport equipment fails, the locking structure of the slide rail 4a has a strong safety protection feature. Therefore, it is a very important tool for the driver and crew.

Further, the active vibration damping seat includes fixing plate 5a. The top end of the second rotating assembly 222a is fixed to the fixed plate 5a, and the fixed plate 5a is detachably provided on the seat 1a.

The embodiment applies to yachts and other water transport equipment and is mainly intended to solve the inertial motion problem caused by braking, turning, or other factors during running. The self-balancing vibration damping device 2a only needs to cope with pitch and roll caused by the inertial motion to ensure the stability of personnel, seat, other devices, or materials in the yacht. Based on the ups and downs of water flow and waves, the active vibration damping seat in this embodiment can be provided with the air springs 2231a (those mentioned in the above embodiment) to actively control the degree of freedom in the height direction and other ordinary spring damping members to passively control the degree of freedom in the height direction. The design can effectively reduce some of the high-frequency low-amplitude vibrations, thus effectively improving the stability of the seat.

It is worth noting that the fixing plate 5a integrates the self-balancing vibration damping device 2a, and the self-balancing vibration damping device is assembled inside the active vibration damping seat to achieve active vibration damping. Subsequently, the self-balancing vibration damping device is assembled on the transport equipment. The self-balancing vibration damping device can also serve as a separate connecting component to connect the active vibration damping seat to the transport equipment to achieve the vibration damping function of the active vibration damping seat. In addition, under certain circumstances, the fixing plate 5a can also be taken as the seat 1a.

The embodiment simplifies the structure, saves the cost, and is widely applicable to water transport equipment such as yachts.

Further, this preferred embodiment provides transport equipment, including the active vibration damping seat described in any one of the above-preferred embodiments.

It should be noted that the above embodiments can be freely combined as required. The above described are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A self-balancing vibration damping system, comprising:
   an active vibration damping module, a control module, a sensor module, and a receiving module, wherein
   the sensor module is provided in an accommodation space of a transport equipment to acquire motion data of the transport equipment;
   the active vibration damping module comprises a first rotating assembly and a second rotating assembly; the first rotating assembly is provided in the accommodation space; and the second rotating assembly is provided at a driving end of the first rotating assembly, and the second rotating assembly is butted with the receiving module; and
   the control module is configured to control the first rotating assembly and the second rotating assembly to operate synchronously according to the motion data to provide a force opposite to a tilt direction of the receiving module; when the first rotating assembly drives the receiving module to roll, the second rotating assembly drives the receiving module to pitch; or when the first rotating assembly drives the receiving module to pitch, the second rotating assembly drives the receiving module to roll.

2. The self-balancing vibration damping system according to claim 1, further comprising:
a support module located below the receiving module, wherein
the first rotating assembly and the sensor module are provided on the support module.

3. The self-balancing vibration damping system according to claim 2, further comprising:
a passive vibration damping module provided on the support module, wherein
the first rotating assembly and the second rotating assembly are connected in series with the passive vibration damping module.

4. The self-balancing vibration damping system according to claim 3, wherein
the passive vibration damping module comprises a spring damper.

5. The self-balancing vibration damping system according to claim 2, wherein
the first rotating assembly comprises a first motor, a first flange seat, and a rotating pair support;
the first motor and the rotating pair support are provided on the support module; and the first flange seat has a first end provided at a driving end of the first motor and a second end hinged to the rotating pair support;
the second rotating assembly comprises a second motor and a second flange seat;
the second motor is provided on the first flange seat, and the second flange seat is provided at a driving end of the second motor and butted with the receiving module; and
a rotation axis of the first motor and a rotation axis of the second motor are perpendicular to each other.

6. The self-balancing vibration damping system according to claim 5, wherein
the first flange seat is provided with a stop element, and the second flange seat is provided with an anti-collision element; and
when the first flange seat and the second flange seat rotate, the stop element and the anti-collision element are butted and mated with each other to restrict continuous rotation of the first flange seat and the second flange seat.

7. The self-balancing vibration damping system according to claim 3, wherein
the receiving module comprises a first platform, and the support module comprises a second platform;
the sensor module is provided at a first end of the second platform towards the first platform; and
the passive vibration damping module is provided at a second end of the second platform away from the first platform.

8. The self-balancing vibration damping system according to claim 3, wherein
the receiving module comprises a first platform, and the support module comprises a second platform and a third platform;
the second platform is located between the first platform and the third platform;
the sensor module is provided at one end of the third platform towards the second platform; and
the passive vibration damping module is provided between the second platform and the third platform.

9. The self-balancing vibration damping system according to claim 8, wherein
four corners of the third platform are respectively provided with four guide rods;
positions of the second platform corresponding to the four guide rods are respectively provided with four sliding holes; and
the four guide rods are slidably connected with the four sliding holes to adjust a distance between the second platform and the third platform under an action of the passive vibration damping module.

10. The self-balancing vibration damping system according to claim 8, wherein
the active vibration damping module further comprises two linear drive assemblies;
the two linear drive assemblies are symmetrically arranged on two opposite sides of the support module, and are connected in parallel with the passive vibration damping module;
the two linear drive assemblies each comprise an electric push rod and a ball joint;
the electric push rod comprises a drive body and a telescopic rod connected with the drive body in a driving manner;
the two drive bodies are symmetrically arranged on two opposite sides of the third platform;
positions of the second platform corresponding to the two telescopic rods are respectively provided with ball joint supports; and
the ball joint is provided at a free end of the telescopic rod and butted with the ball joint support.

11. The self-balancing vibration damping system according to claim 3, wherein
the first rotating assembly comprises a first motor, a first flange seat, and a rotating pair support;
the first motor and the rotating pair support are provided on the support module; and the first flange seat has a first end provided at a driving end of the first motor and a second end hinged to the rotating pair support;
the second rotating assembly comprises a second motor and a second flange seat;
the second motor is provided on the first flange seat, and the second flange seat is provided at a driving end of the second motor and butted with the receiving module; and
a rotation axis of the first motor and a rotation axis of the second motor are perpendicular to each other.

12. The self-balancing vibration damping system according to claim 4, wherein
the first rotating assembly comprises a first motor, a first flange seat, and a rotating pair support;
the first motor and the rotating pair support are provided on the support module; and the first flange seat has a first end provided at a driving end of the first motor and a second end hinged to the rotating pair support;
the second rotating assembly comprises a second motor and a second flange seat;
the second motor is provided on the first flange seat, and the second flange seat is provided at a driving end of the second motor and butted with the receiving module; and
a rotation axis of the first motor and a rotation axis of the second motor are perpendicular to each other.

* * * * *